United States Patent
Ippatapu

(10) Patent No.: US 11,204,713 B1
(45) Date of Patent: Dec. 21, 2021

(54) TECHNIQUES FOR SELECTION OF A DATA REDUCTION TECHNIQUE WHEN PERFORMING DATA REPLICATION

(71) Applicant: EMC IP Holding Company LLC, Hopkinton, MA (US)

(72) Inventor: Venkata L R Ippatapu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/885,844

(22) Filed: May 28, 2020

(51) Int. Cl.
*G06F 3/06* (2006.01)

(52) U.S. Cl.
CPC .............. *G06F 3/065* (2013.01); *G06F 3/067* (2013.01); *G06F 3/0608* (2013.01); *G06F 3/0613* (2013.01); *G06F 3/0659* (2013.01); *G06F 3/0683* (2013.01)

(58) Field of Classification Search
CPC ...... G06F 3/065; G06F 3/0608; G06F 3/0613; G06F 3/0659; G06F 3/067; G06F 3/0683
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 8,275,897 B2 * | 9/2012 | Fallon | H03M 7/30 709/231 |
| 8,566,286 B1 * | 10/2013 | Hawton | G06F 16/00 707/654 |
| 10,521,317 B1 | 12/2019 | Dorman et al. | |
| 2005/0120128 A1 * | 6/2005 | Willes | H04N 21/64784 709/232 |
| 2011/0302577 A1 * | 12/2011 | Reuther | G06F 9/45558 718/1 |
| 2012/0011637 A1 * | 1/2012 | Fries | H01F 7/0263 2/243.1 |

(Continued)

OTHER PUBLICATIONS

Venkata L.R. Ippatapu, "System and Method for Performance Based Dynamic Optimal Block Size Data Deduplication," U.S. Appl. No. 16/408,919, filed May 10, 2019.

*Primary Examiner* — Eric Cardwell
(74) *Attorney, Agent, or Firm* — Muirhead and Saturnelli, LLC

(57) ABSTRACT

Techniques for processing data may include: receiving a write operation that writes first data to a first storage device of a first data storage system that is configured for replication on a second storage device of a second data storage system; and replicating the first data on the second storage device on the second data storage system. The replicating may include identifying the first data of the first storage device to be replicated on the second storage device of the second data storage system; selecting a compression technique in accordance with an expected wait delay of the first data, wherein the first expected wait delay denotes an amount of time the first bucket of data is expected to wait before transmission to the second data storage system; compressing the first data using the selected first compression technique; and sending the compressed first data to the second data storage system.

21 Claims, 9 Drawing Sheets

(56) References Cited

U.S. PATENT DOCUMENTS

| | | | |
|---|---|---|---|
| 2014/0196102 A1* | 7/2014 | Parm | H04N 21/44004 |
| | | | 725/110 |
| 2014/0237201 A1* | 8/2014 | Swift | G06F 3/065 |
| | | | 711/162 |
| 2019/0095112 A1* | 3/2019 | Lingarajappa | G06F 3/0608 |

* cited by examiner

| Data Compression Technique 402 | Compression Rate 404 | Average Latency 406 | Compression Ratio 408 |
|---|---|---|---|
| Compression technique 1 | Y11 MBs/second | Y12 microseconds | N1:1 |
| Compression technique 2 | Y21 MBs/second | Y22 microseconds | N2:1 |
| Compression technique 3 | Y13 MBs/second | Y13 microseconds | N3:1 |
| Compression technique 4 | Y14 MBs/second | Y14 microseconds | N4:1 |

TECHNIQUES FOR SELECTION OF A DATA REDUCTION TECHNIQUE WHEN PERFORMING DATA REPLICATION

BACKGROUND

Technical Field

This application generally relates to data storage and more particularly to techniques used in connection with selection of a data reduction technique.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, an application may executed on the host and the application may issue I/O (input/output) operations, such as data read and write operations, sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for processing data comprising: receiving, at a first data storage system, a write operation that writes first data to a first storage device of the first data storage system, wherein the first storage device is configured for replication on a second storage device of a second data storage system; and performing first processing that replicates the first data on the second storage device on the second data storage system, the first processing comprising: identifying the first data of the first storage device to be replicated on the second storage device of the second data storage system; selecting a first compression technique from a set of available compression techniques in accordance with a first expected wait delay associated with the first data, wherein the first data is located in a first bucket of a queue of data waiting to be transmitted to the second data storage system, and wherein the first expected wait delay denotes an amount of time the first bucket of data is expected to wait prior to being transmitted from the first data storage system to the second data storage system; compressing the first data using the selected first compression technique and generating first compressed data; and sending the first compressed data from the first data storage system to the second data storage system.

In at least one embodiment, the first compressed data may be sent to the second data storage system over a link between the first data storage system and the second data storage system, and wherein the link may be used by a remote data facility that performs automated data replication to replicate data from storage devices of the first data storage system to corresponding configured storage devices of the second data storage system. A sending window may be associated with the link and the sending window may include the queue of data transmitted from the first data storage system to the second data storage system as part of replication processing that replicates data from the first data storage system to the second data storage system. The replication processing may be performed by the remote data facility. The sending window may be partitioned into a plurality of data buckets and the first bucket including the first data may be one of the plurality of data buckets of the sending window of the link. The first expected wait delay may be an average expected wait delay denoting an average wait time expected prior to transmitting the first bucket of data. The plurality of data buckets of the sending window may form a sequence denoting a sequential order in which the plurality of buckets of data is transmitted from the first data storage system to the second data storage system. The sending window may have a size that is a maximum amount of outstanding data the first data storage system is allowed to send to the second data storage system over the link without receiving an acknowledgement regarding successful transmission to the second data storage system.

In at least one embodiment, the set of available compression techniques may include a plurality of compression techniques each having a different compression rate and each having a different expected average compression latency for compressing the first data. A table may include the set of available compression techniques and associated information regarding each of the available compression techniques. The associated information for said each available compression technique may include the different expected average compression latency for said each available compression technique.

In at least one embodiment, a table may include a plurality of expected wait delays for the plurality of buckets, and wherein the table may include a first entry that includes the first expected wait delay for the first bucket. The table may include a different set of entries for each of the plurality of buckets. Each entry of the different set of entries for said each bucket may denote an expected wait delay for data of said each bucket for a different network latency. The table may be preconfigured prior to performing the first processing that replicates the first data on the second storage device on the second data storage system. The table may include a different set of entries for each of the plurality of buckets. Each entry of the different set of entries for said each bucket may denote an expected wait delay for data of said each bucket in accordance with a plurality of factors related to a configuration of the first data storage system and related to at least one network between the first data system and the second data storage system. The plurality of factors may include any one or more of: a network latency of the at least one network, a first number denoting a number of processors that compress data that is replicated from the first data storage system to the second data storage system, a current workload of each of one or more processors used to compress data that is replicated from the first data storage system to the second data storage system, a second number denoting a number of components that compress data that is replicated from the first data storage system to the second data storage system, and a current workload of each of one or more components that compress data that is replicated from the first data storage system to the second data storage system.

In at least one embodiment, the first processing may include determining a first value for an error metric in accordance with a current wait delay and the first expected wait delay for the first bucket; and if the first value indicates that the current wait delay is less than the first expected wait delay by at least a specified threshold amount, selecting the first compression technique from the set of available compression techniques based on a second expected wait delay of the table associated with a second of the plurality of buckets of data transmitted to the second data storage system, wherein the second bucket of data is transmitted prior to the second data storage system prior to the first bucket of data, and wherein the second expected wait delay is less than the first expected wait delay. A first expected average compression latency of using the first compression technique to compress the first data may not be greater than the second expected wait delay.

In at least one embodiment, the first processing may include determining a first value for an error metric in accordance with a current wait delay and the first expected wait delay for the first bucket; and if the first value indicates that the current wait delay is more than the first expected wait delay by at least a specified threshold amount, selecting the first compression technique from the set of available compression techniques based on a second expected wait delay of the table associated with a second of the plurality of buckets of data, wherein the second bucket of data is transmitted to the second data storage system after the first bucket of data, and wherein the second expected wait delay is more than the first expected wait delay. A first expected average compression latency of using the first compression technique to compress the first data may not be greater than the second expected wait delay.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5 and 6 are examples of tables that may be used in an embodiment in accordance with the techniques herein;

DETAILED DESCRIPTION OF EMBODIMENT(S)

Figure 1:
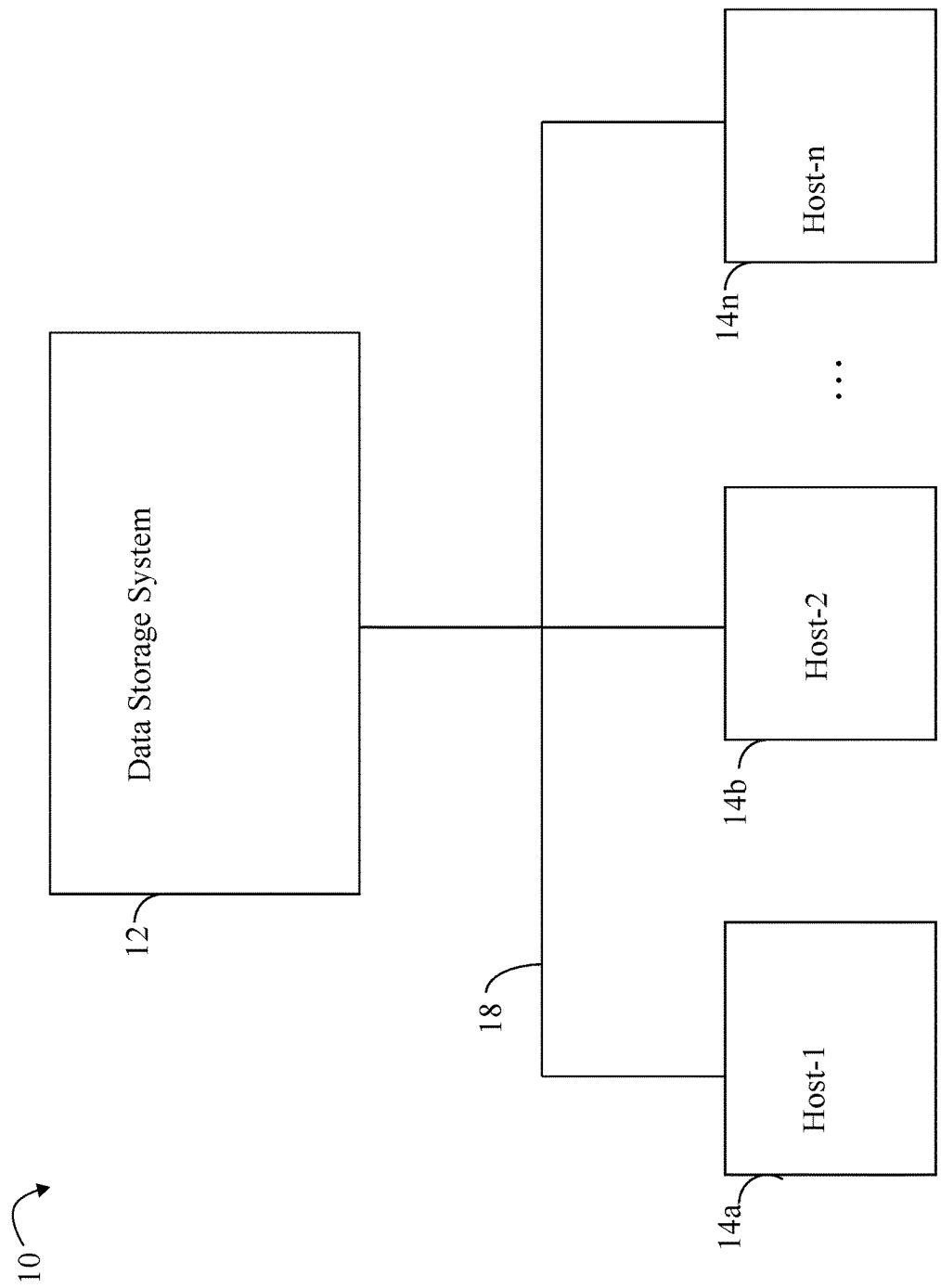
FIG. 1 is an example of an embodiment of a system that may utilize the techniques described herein.

Referring to FIG. 1, shown is an example of an embodiment of a system that may be used in performing the techniques described herein. The system 10 includes a data storage system 12 connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
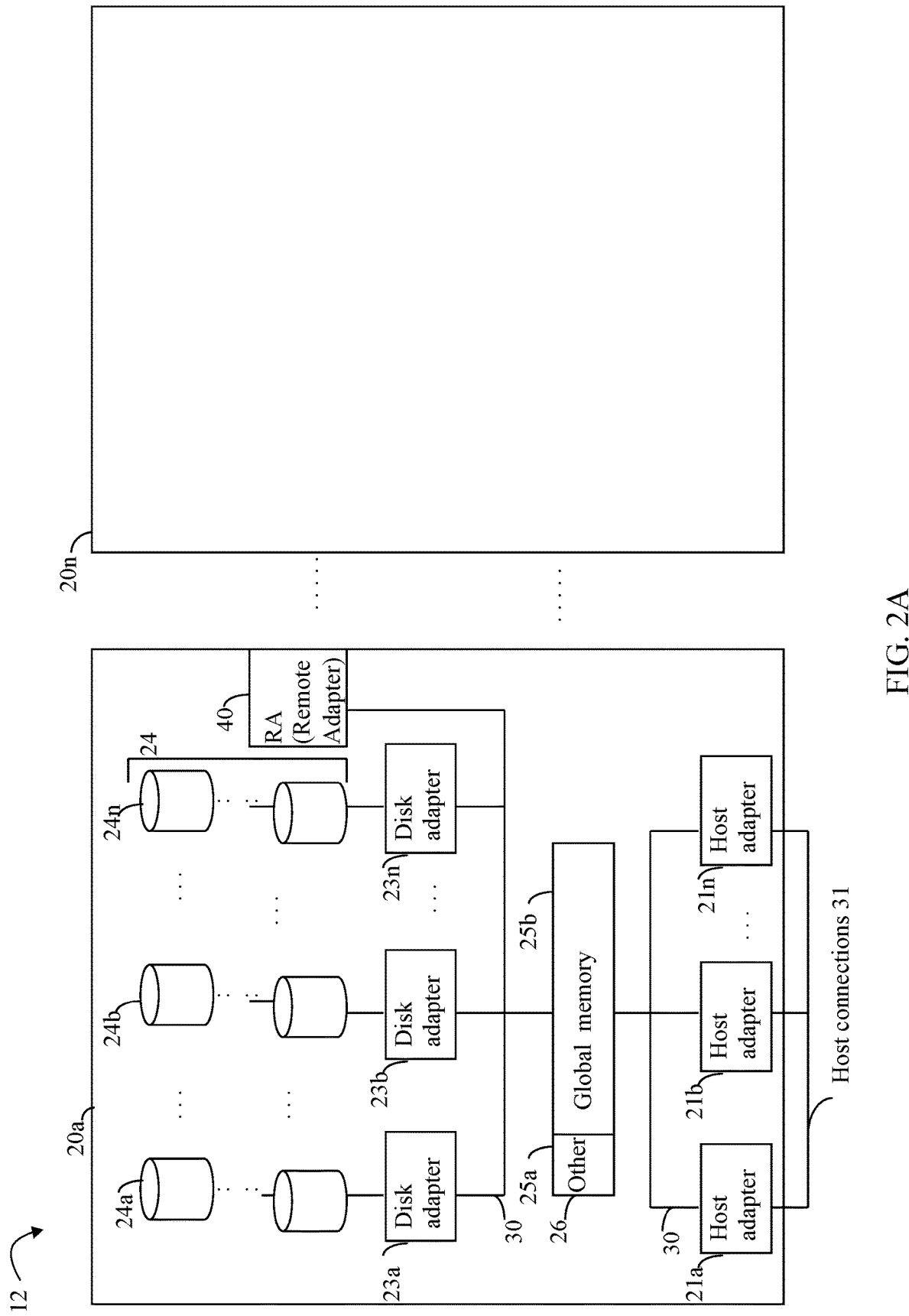
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more of the communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in the following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems.

Each of the data storage systems, such as 20a, may include a plurality of data storage devices (e.g., physical non-volatile storage devices), such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in the following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by Dell Inc. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with the techniques herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, where such destaging may be performed by a DA.

The host systems provide data and access control information through channels to the storage systems, and the storage systems may also provide data to the host systems also through the channels. The host systems do not address the disk drives of the storage systems directly, but rather access to data may be provided to the one or more host systems from what the host systems view as a plurality of logical devices, logical volumes or logical units (LUNs). The LUNs may or may not correspond to the actual disk drives. For example, the one or more LUNs may reside on a single physical disk drive. The data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
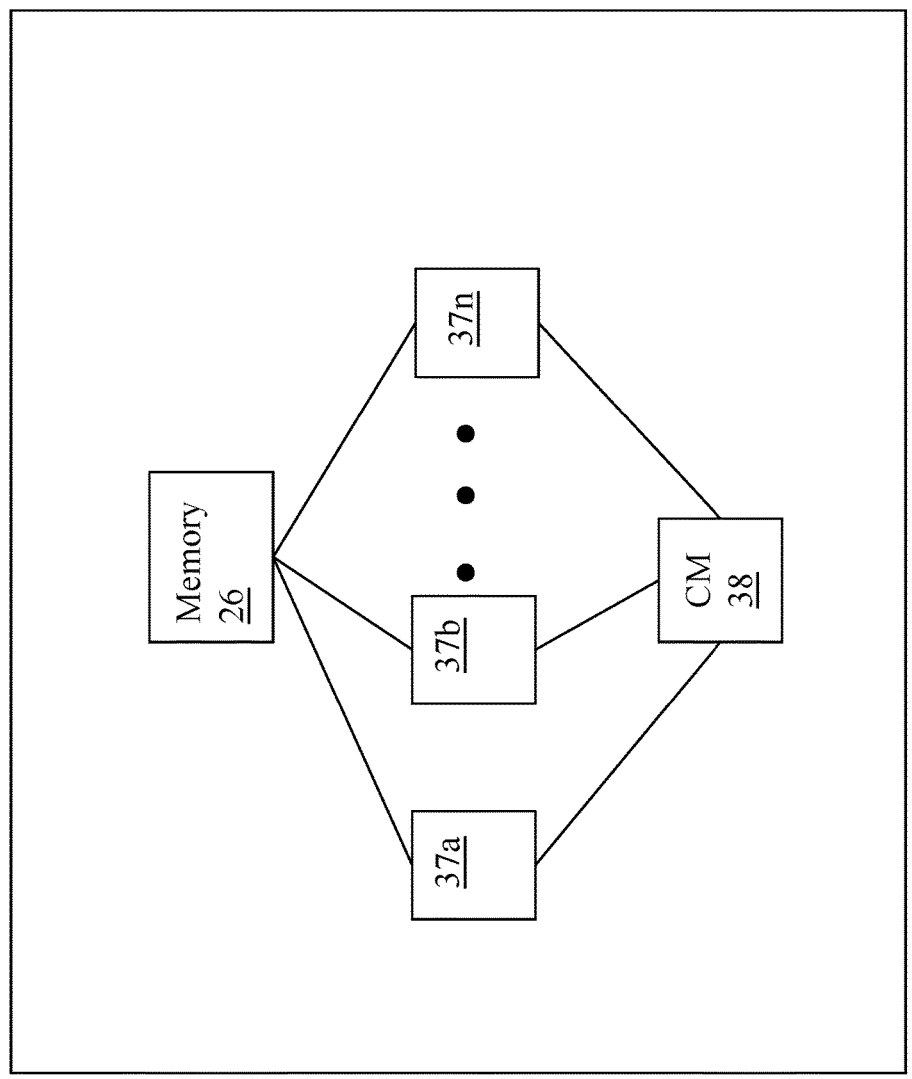
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with the techniques herein, components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
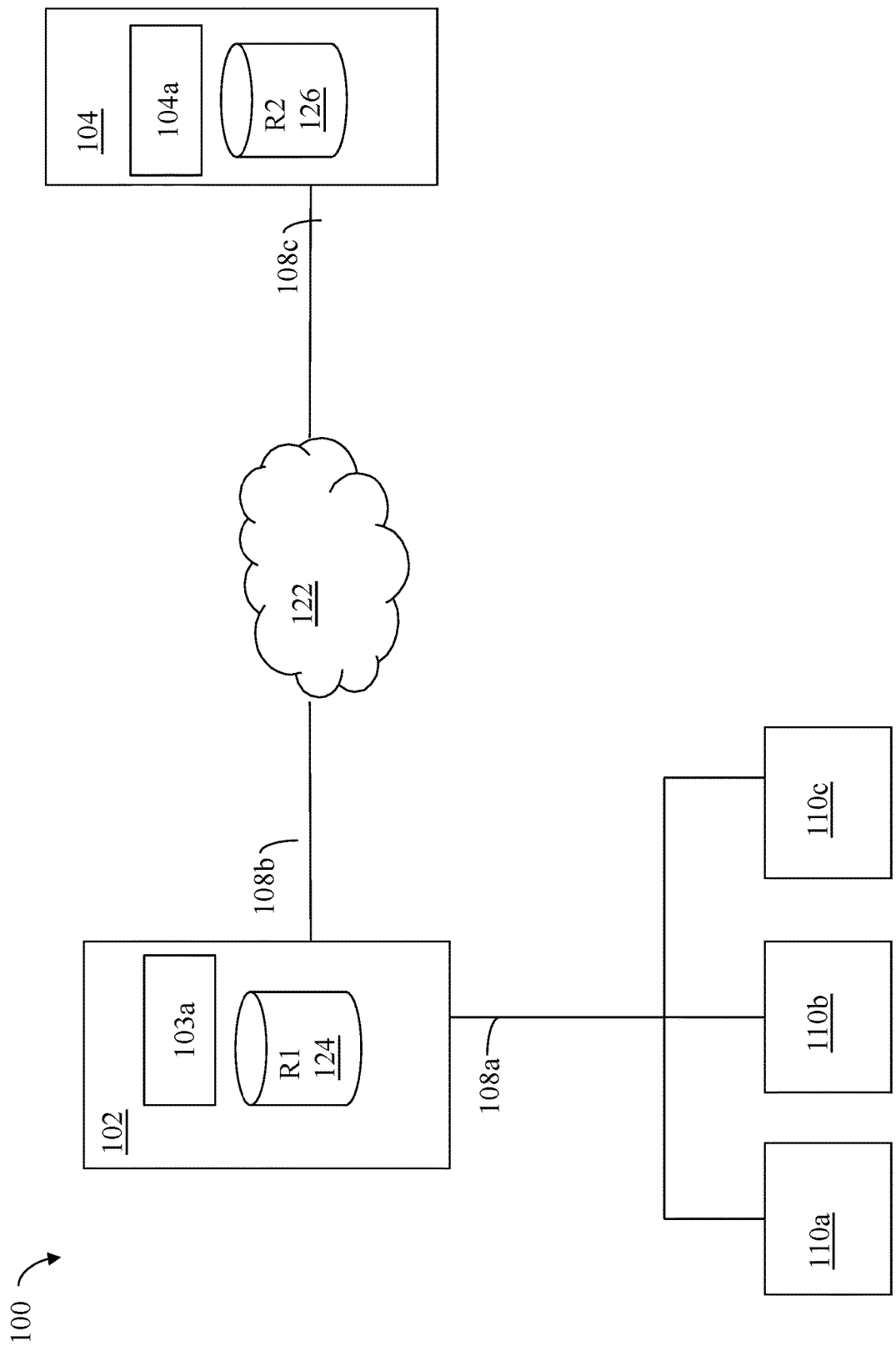
FIG. 3 is an example of components of a system that may be used in connection with the techniques herein.

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are the data storage systems 102 and 104, and the hosts 110a, 110b and 110c. The data storage systems 102, 104 may be remotely connected and communicate over the network 122, such as the Internet or other private network, and facilitate communications with the components connected thereto. The hosts 110a, 110b and 110c may issue requests or operations to the data storage system 102 over the connection 108a. The hosts 110a, 110b and 110c may be connected to the data storage system 102 through the connection 108a which may be, for example, network or other type of communication connection. Although not illustrated, the hosts 110a-110c may also be directly connected to a network such as the Internet.

The data storage systems 102 and 104 may include one or more physical and logical data storage devices. In this example, the data storage system 102 includes device R1 124, and the data storage system 104 includes the device R2 126. In at least one embodiment, the R1 and R2 devices may be logical devices, such as LUNs. The data storage system 102 may be characterized as local with respect to the hosts 110a, 110b and 110c. The data storage system 104 may be characterized as remote with respect to the hosts 110a, 110b and 110c. For example, in some embodiments in accordance with the techniques herein, the distance between the data storage systems 102 and 104 may be 200 km or more.

The host 110a may issue a command, such as to write data to the device R1 of the data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by Dell Inc. Data storage device communication between data storage systems using SRDF® is described, for example, in U.S. Pat. Nos. 5,742,792, 5,544,347, and 7,054,883, all of which are incorporated by reference herein. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 110a interacts directly with the device R1 of the data storage system 102, but any data changes made are automatically provided to the R2 device of the data storage system 104 using SRDF®. In operation, the host 110a may read and write data using the R1 volume in the data storage system 102, and SRDF® may handle the automatic copying and updating of data from R1 to R2 in the data storage system 104.

As illustrated in connection with other figures herein, the data storage system 102 may have one or more RAs included therein to facilitate remote connections to the data storage system 104. Communications between the storage system 102 and 104 may be made over the connections 108b,108c to network 122. The data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968, 369, Nov. 22, 2005, Veprinsky, et al., REMOTE DATA FACILITY OVER AN IP NETWORK, which is incorporated by reference herein. In connection with SRDF®, a single RDF link or path may be between an RA of the system 102 and an RA of the system 104. As described in more detail below, techniques are described for use in transmitting data over one or more RDF links, such as I/O traffic including write data in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on the data storage system 102, have corresponding target devices of a target group, such as devices on the data storage system 104. The devices in a source group may be mirrored in corresponding devices of a target group using SRDF® functionality.

The techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, one of the hosts 110a-c may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system.

In at least one embodiment performing data replication operating in the asynchronous replication mode, an acknowledgement regarding completion of a host write from one of the hosts 110a-c may be sent to the host from the first data storage system 102 once the write data has been written to the data cache 103a on the system 102. Consistent with the discussion elsewhere herein, the write data is subsequently destaged from 103a to physical storage provisioned for the R1 device 124. Additionally, the write data is also transferred to the second data storage system 104 where the write data is then written to the data cache 104a, and acknowledgement is returned from the system 104 to the system 102, and subsequently the write data is destaged from 104a to physical storage provisioned for the R2 device 126.

In at least one embodiment performing data replication operating in the synchronous replication mode, the first data storage system 102 receives a write I/O operation from one of the hosts 110a-c. The system 102 stores the write data in its data cache 103a. Consistent with the discussion elsewhere herein, the write data is subsequently destaged from 103a to physical storage provisioned for the R1 device 124. Additionally, the write data is also transferred to the second data storage system 104, where the write data is then written to the data cache 104a, an acknowledgement is returned from system 104 to 102, and subsequently the write data is destaged from 104a to physical storage provisioned for the R2 device 126. The second data storage system 104 sends an acknowledgement to system 102 acknowledging receipt of the write data once the write data has been written to the data cache 104a of the system 104. The first data storage system 102 returns an acknowledgement to the host that sent the write I/O operation once the system 102 receives the acknowledgement from the system 104 regarding the write data.

Depending on the physical distance between the data storage systems 102, 104, it may be desirable to operate in a mode such as asynchronous to avoid host timeouts while the host awaits acknowledgement regarding completion of a host I/O.

Figure 4:
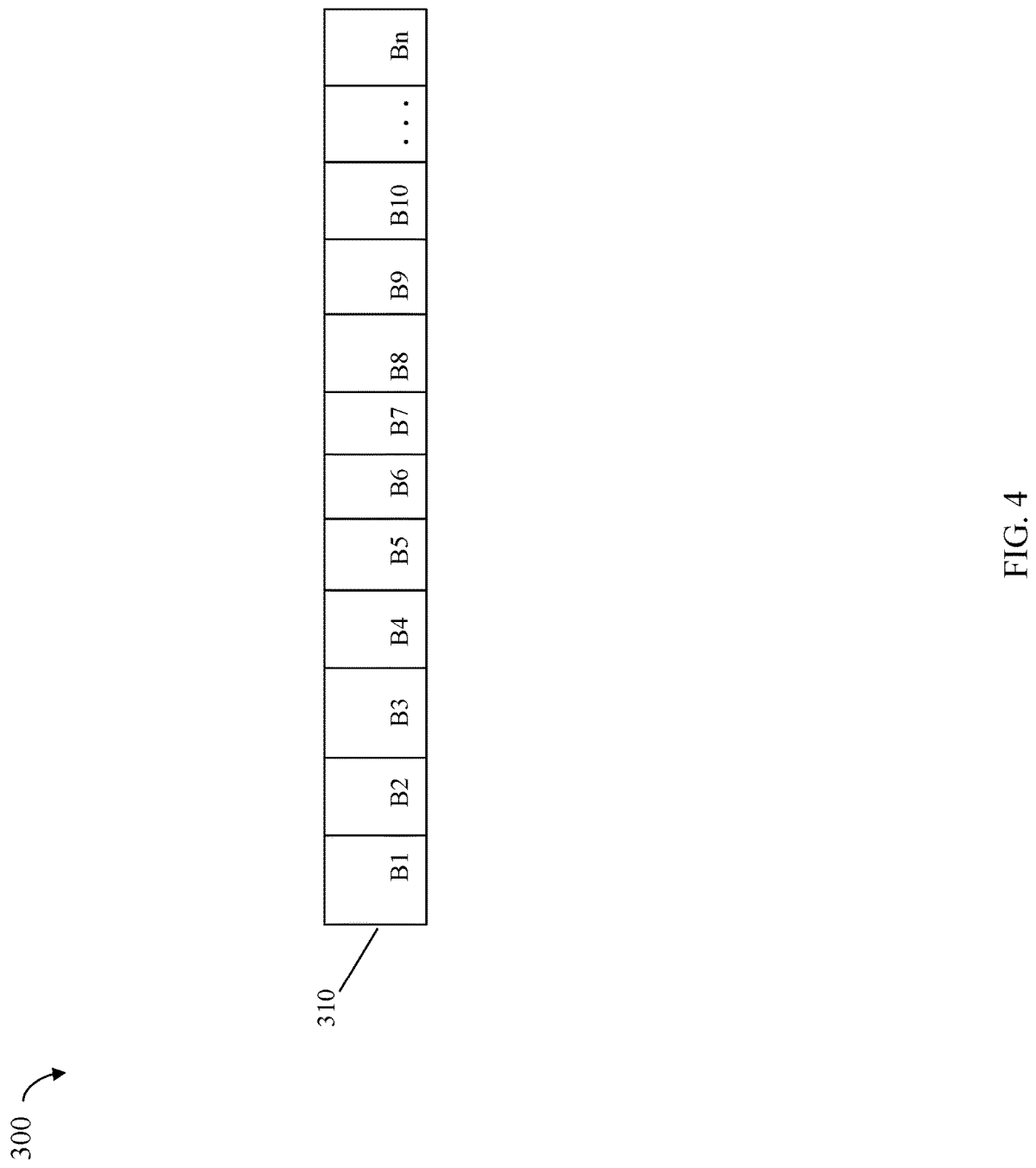
FIG. 4 is an example illustrating partitioning of a network send window into multiple buckets of data in an embodiment in accordance with the techniques herein.

The local and remote data storage systems, such as the systems 102 and 104 in the FIG. 4, may be connected over a network. The network may use any suitable protocols. For example, in at least one embodiment, the network may operate in accordance with the Ethernet protocol, such as at the physical layer, and may operate in accordance with TCP/IP (Transport Control Protocol/Internet Protocol), such as with respect to the transport and network layers. Improvements in network performance have not matched improvements in processing performance, such as related to processors on the data storage systems. The underlying network connecting the local and remote data storage systems introduces network latency, such as round trip time (RTT) latency, packet drops, packet timeouts, retransmission of data, and the like). The foregoing network latency can adversely affect the performance of RDF replication services. Thus, in connection with data replication such as from the local system to the remote system, replication data transmitted from the local system may be backed up or queued up, such as queued in a network send window, waiting to be transmitted across an RDF link.

A data storage system may perform various data services. For example, in at least one embodiment, the data storage system may perform one or more data reduction services such as data compression and decompression. A data storage system may include compression hardware and/or compression software. In at least one embodiment, the data storage system may be configured to send compressed data on a network, such as in connection with transmitting data by the RDF over an RDF link for remote replication, to reduce network bandwidth usage on congested networks. The compression hardware or software compression may be capable of performing various types of compression methods, including by way of example compression methods such as Lempel-Ziv (LZ), Lempel-Ziv-Stac (LZS), Deflate, Huffman, and the like. Different compression methods can have different characteristics, such as differing compression rates and differing compression ratios. In some cases, a compression method such as LZ, LZS, Deflate or Huffman may have different compression rates or compression ratios which depend on configuration parameters for the compression methods. A compression ratio may be defined as the ratio between the uncompressed size and the compressed size of data. Generally, the greater the compression ratio of a given compression method, the greater is the latency of the given compression technique as the compression hardware or software typically consumes more time to compress the data but is not so restricted always. Generally, the greater the compression ratio of a given compression technique or method, the greater the latency of the given compression technique and also the lower the compression rate, but is not so restricted always. Different compression methods have different latencies, compression rates and compression ratios. The overall I/O latency may include processing overhead on a local storage system, compression latency at the local storage system, network latency, decompression latency at a remote storage system, and processing overhead on the remote storage system.

As noted above, in connection with data replication such as from the local system to the remote system, replication data transmitted from the local system may be backed up or queued up, such as queued in a network send window (sometimes also referred to as a network sending window, sending window or send window), on the local system waiting to be transmitted across an RDF link. Typically there may be a significant amount of queue wait delay with such data in the network send window. First data buffering in the backend or bottom of the queue wait for transmission of other data that is located ahead in the front end of the queue. The additional time delay in the queue (also sometimes referred to as queueing wait delay, queue wait delay or simply wait delay) may further increase the I/O latency when transmitting data in connection with remote replication, such as by a RDF process.

Described in the following paragraphs are techniques that may be used in connection with performing data replication with any suitable mode, such as an asynchronous mode, synchronous mode and other suitable replication modes that may be operable with the particular RDF utilized in an embodiment in accordance with the techniques herein.

Described in the following paragraphs are techniques that may be used in connection with performing replication which take into account the queue wait delay of data waiting for transmission from the local system to the remote system. The techniques described in the following paragraphs apply data reduction techniques to the data transmitted from the local system to the remote system. A particular data reduction technique may be selected from available data reduction techniques in accordance with the queue wait delay of the data to be compressed and then transmitted. In at least one embodiment, the queue wait delay of data in the sending window may be used to select a particular compression technique used to compress the queued data. The queue wait delay with respect to a particular bucket of data may denote an average amount of time expected to elapse prior to sending the particular bucket of data over an associated link. The compression technique used to compress data may be dynamically selected based on the particular position of the data in the queue, where the particular bucket denotes the position of the data in the queue relative to other data that is also included in the queue or sending window awaiting transmission.

The available compression techniques may include multiple compression techniques. For example, the available compression techniques may include a first compression technique and a second compression technique. The first compression technique may compress data at a first rate that is higher than a second rate at which the second compression technique compresses data. The first compression technique may thus be expected to compress a first data portion in less time that the second compression technique. However, the second compression technique may be able to compress the first data portion to a smaller size than the first compression technique, whereby the first compression technique may achieve a first compression ratio that is less than a second compression ratio achieved with the second compression technique. For data having an associated high queue wait delay, the second compression technique may be selected that is expected to take a longer time and achieve better compression. For data having an associated lower queue wait delay, the first compression technique may be selected that is expected to take a shorter amount of time but not achieve as much compression as if the second compression technique is used. Thus, the expected queue wait delay, that may vary with the different positions or data buckets in the queue or sending window of data awaiting transmission, may be used in dynamically selecting one of the available compression techniques used to compress data in the different data buckets.

In at least one embodiment, the network send window may be partitioned into multiple buckets of data, where each bucket may denote a same size chunk or portion of data. Thus, the ordering and relative placement of the buckets in the send window may denote a sending queue or sequence in which data is to be transmitted from the local system to the remote system such as part of replication processing of a RDF. A table may include expected queue wait delay times for the different buckets. In at least one embodiment, the table may include multiple entries for each bucket, where each such one of the multiple entries associated with one of the buckets includes a different queue wait delay time for a different network latency time. In at least one embodiment, each of the network latency times may denote a different average round trip latency time to transmit data over a network between the local system and the remote system, where the network is used to transmit data that is replicated as part of RDF processing. In at least one embodiment, the table may include multiple entries for each bucket, where each such one of the multiple entries associated with one of the buckets includes a different queue wait delay time based on different values or current conditions of one or more factors. The one or more factors may be related to a configuration of the local data storage system and/or related to at least one network between the first data system and the second data storage system. The one or more factors may include any one or more of: a network latency of the at least one network, a number of processors that compress data that is replicated from the local to the remote system, a current workload of each of one or more processors used to compress data that is replicated from the local to the remote system, a number of components that compress data that is replicated from the local to the remote system, and a current workload of each of one or more components that compress data that is replicated from the local to the remote system.

At runtime, such as part of processing performed by a RDF in at least one embodiment, when determining which compression technique to use for compressing data in a particular bucket, an expected queue wait delay may be selected from the table based on the particular bucket and the current network latency. The current queue wait delay with respect to the particular bucket may be determined. The current queue wait delay may denote an observed average queue wait delay or latency regarding the amount of time expected to elapse prior to transmitting data of the particular bucket. The current queue wait delays for the buckets may be computed based on real time monitoring and observations regarding the average queueing delay of data buffers residing in each of the partitioned send window buckets. Thus, the current queue wait delays may vary over time based on the current conditions and configuration of the network and data storage systems. For example, the current queue wait delays may vary with the particular configuration of the data storage system and the resources currently allocated and used in performing compression processing and data replication and transmission with the RDF. The current queue wait delays may vary dynamically over time with, for example, the current workload of the different components or processors used to compress the data transmitted. The current queue wait delay may vary with, for example, the current network conditions and traffic with respect to the network used in connection with transmitting the data over an RDF link from the local system to the remote system as part of remote data replication processing of the RDF.

The current queue wait delay and the expected queue delay may be used to compute a first value for an error metric. If the first value is within specified tolerances or limits and indicates that the current wait delay is less than the expected wait delay by at least a specified threshold amount, the compression technique selected from the set of available compression techniques may be based on a second expected wait delay of the table associated with a second of the buckets of data transmitted to the remote data storage system prior to transmitting the particular bucket of data. The second expected wait delay may be less than the expected wait delay. A first expected average compression latency of using the compression technique to compress the data of the particular bucket may not be greater than the second expected wait delay and may not be greater than the current wait delay.

If the first value is within specified tolerances or limits and indicates that the current wait delay is more than the expected wait delay by at least a specified threshold amount, the compression technique selected from the set of available compression techniques may be based on a second expected wait delay of the table associated with a second of the buckets of data transmitted to the remote data storage system after transmitting the particular bucket of data. The second expected wait delay may be more than the expected wait delay. A first expected average compression latency of using the compression technique to compress the data of the particular bucket may not be greater than the second expected wait delay and may not be greater than the current wait delay.

In at least one embodiment in accordance with the techniques herein, a compression technique may be selected for compressing first data in a particular bucket. The compression technique may be expected to compress the first data in a specified amount of time, an expected average compression latency. The particular bucket may have an expected queue wait delay denoting the average amount of time that data in the particular bucket is expected to wait in the queue before being transmitted. The selected compression technique's expected average compression latency may not exceed the expected queue wait delay for the particular bucket. The foregoing and other details of the techniques herein are described in the following paragraphs.

In connection with examples described in the following paragraphs, the local or R1 data storage system may receive a sequence of host write I/O operations directed to one or more R1 devices of the R1 data storage system. Consistent with other discussion herein, the data written by the host write I/O operation may be stored in the cache of the R1 or local data storage system. At a later point in time, the cached write data may be destaged from the cache of the R1 system to the backend non-volatile physical storage devices of the R1 data storage system providing physical storage allocated for use in storing the data of the one or more R1 devices. Additionally, the write data may be automatically transmitted to the R2 or remote data storage system by the RDF as part of the remote replication processing. The write data received by the R2 system may be stored in the cache of the R2 system, and then the cached write data is subsequently destaged to the backend non-volatile physical storage devices of the R2 data storage system providing physical storage allocated for use in storing the data of the one or more R2 devices logically paired with the one or more R2 devices of the R1 system.

Referring to FIG. 4, shown is an example 300 illustrating the data 310 in an embodiment in accordance with the techniques herein. The data 310 may denote the data included in a memory or buffer of the R1 or local data storage system, where the data 310 is included in a network send window or queue of data waiting to be transmitted from the local or R1 data storage system to the remote or R2 data storage system as part of remote data replication by a RDF. In at least one embodiment, the data 310 may include write I/O payload data as well as other data, such as metadata.

The data 310 may be partitioned into multiple chunks or buckets of the network send window of the local data storage system, where each such chunk or bucket "i" is denoted as Bi, and where "i" is a positive integer. For example, in FIG. 4 illustrated are the labeled data buckets B1, B2, B3, ..., and so on, up to Bn. In at least one embodiment, each bucket Bi may denote a same number of bytes, such as 1K bytes.

In at least one embodiment, the data 310 may denote the sequence or queue of the next buffered "n" buckets of data in the network send window, where such data 310 is awaiting transmission over an RDF link from the R1 data storage system to the R2 data storage system. In at least one embodiment, the data may be transmitted in consecutive sequential order based on increasing bucket number (e.g., transmitted in the consecutive sequential ordering of bucket B1, B2, B3, B4, ..., $B_{n-1}$, Bn). Thus, the data of the bucket Bi is transmitted immediately prior to the data of bucket $B_{i1}$.

Referring to FIG. 5, shown is an example 400 of a table of available data reduction techniques that may be used in an embodiment in accordance with the techniques herein. The data reduction techniques may be data compression techniques. The table 400 includes the following columns of information: data compression technique 402, compression rate 404, average latency 406 and compression ratio 408. Each row of the table 400 may include information relevant for a single different compression technique. In at least one embodiment, the information in the column 406 may be used to select a particular one of the available compression techniques 402. The data compression technique 402 lists the names of the different available compression techniques. Each of the different compression techniques of 402 may be a different compression method or algorithm as well as a possible variation of an algorithm such as based on different parameters supplied to the algorithm. The available compression techniques may be embodied in software and/or hardware. The compression rate 404 lists the different compression rates, such as in MBs/second, at which the compression techniques compress data. The average latency 406 may list the different average compression latencies, such as in microseconds, denoting the average amount of time it takes the different compression techniques to compress a data portion or chunk of a particular size. In at least one embodiment, the latencies in the column 406 may be the average amount of time it takes the different compression techniques to compress an amount of data included in each of the equally sized buckets B1-Bn of the send window or queue of FIG. 4. The compression ratio 408 lists the different compression ratios for the different available compression techniques.

To further illustrate, the row 402 of the table 400 includes the compression rate of Y11 MBs/second (404), the average latency of Y12 microseconds (406), and the compression ratio of N1:1 (408) for the compression technique 1. In a similar manner, each row of the table 400 may include corresponding information for a different compression technique.

The information in the table 400 may be generated in any suitable manner. In at least one embodiment, the information in the table 400 may be generated based on performance tests conducted using a RDF with various data sets having different characteristics. Consistent with discussion elsewhere herein, the techniques herein provide for selection of one of the data compression techniques based on a queue wait delay, for example, by comparing the queue wait delay to the different average latency times in the column 406. In at least one embodiment, processing may be performed in connection with the techniques herein to select one of the available compression techniques in the table 400 where the selected compression technique has an average latency denoted in column 406 that does not exceed the queue wait delay. Additionally, the selected compression technique's average latency in the column 406 may also be the largest of the average latency values in the column 406 that does not exceed the queue wait delay. As discussed in more detail below, the queue wait delay may be an expected queue wait delay obtained from an entry of the table of FIG. 6. As also discussed in more detail elsewhere herein, the queue wait delay may be a current wait delay computed for a particular bucket. The current queue wait delays for the buckets may be computed based on real time monitoring and observations regarding the average queueing delay of data buffers residing in each of the partitioned send window buckets. The current wait delays for the different buckets of the send window may be computed by monitoring the observed wait delay behavior of data in the buckets waiting for transmission from the local system to the remote system.

With reference to FIG. 5, generally the compression ratio, denoting an expected level of compression, increases with the average compression latency.

Figure 6:
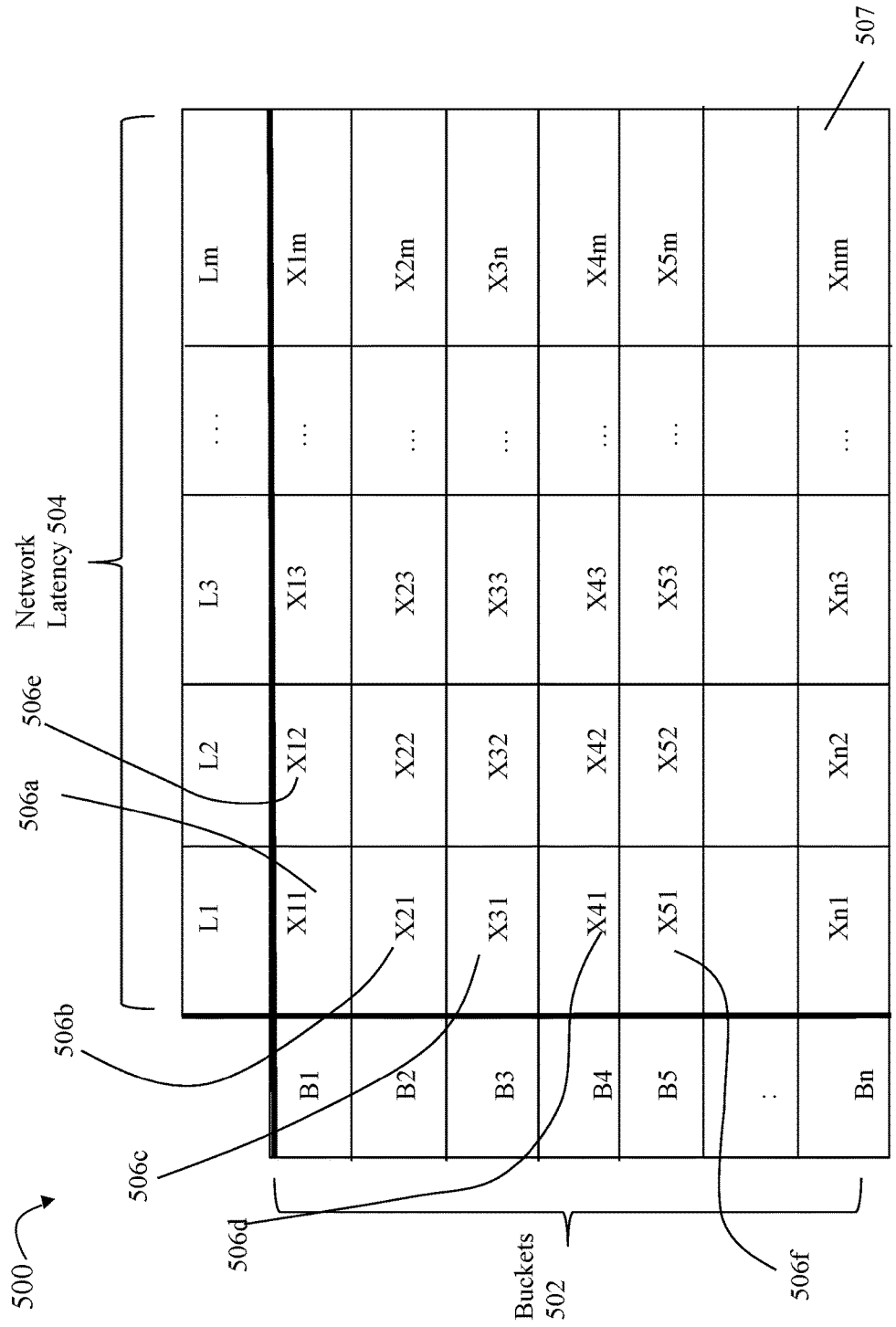

Referring to FIG. 6, shown is an example 500 of a matrix or table of expected queue wait delays for different data buckets of the send window that may be used in an embodiment in accordance with the techniques herein. The table 500 includes a row index denoting the buckets 502 and a column index corresponding to a different one of multiple network latencies 504.

The table 500 includes a row for each of the different n buckets B1 through Bn of the send window as illustrated in FIG. 4 and described elsewhere herein. The table 500 includes a column for each of m different network latencies. In at least one embodiment, the network latencies may be in milliseconds and the entries of the table denoting the expected queue wait delays for the different buckets may be in microseconds.

Each of the different network latencies L1 through Lm corresponds to a different one of the columns in the table 500. The time denoted by a particular network latency value may be a round trip time latency over the network used to transmit data from the local system to the remote system, and then return from the remote system to the local system. In this context, the source is the local system initiating the data packet or signal and the destination is the remote system that receives the signal and retransmits it. For network latencies Li and Lj, if i<j, then Li<Lj.

Each cell or entry of the table 500 having associated indices of row R and column C, includes an expected queue wait delay for a particular bucket R when there is a network delay corresponding to the column C. For example, X11 in the entry or cell 506a denotes the expected queue wait delay of the data in the bucket 1 when the network latency is L1 milliseconds; and X12 in the entry or cell 506e denotes the expected queue wait delay of the data in the bucket 1 when the network latency is L2 milliseconds. The expected queue wait delays in the entries of the table 500 increase as the row index increases and also increase within a column as the column index increases. Thus, X11 at the entry (1,1) 506a in the table 500 denotes the lowest expected queue wait delay in the table; and Xnm at the entry (n, m) 507 of the table 500 denotes the largest expected queue wait delay in the table 500. The expected queue wait delays in the cells or entries of the table may be average time delay values for data in each of the buckets.

In at least one embodiment, the table 500 may be preconfigured prior to performing replication using the RDF. The average queue wait delay of data residing in each bucket may be mathematically computed by exhausting the data in the send window for the various network latencies. For example, the average queue wait delay of bucket B4 when the network latency is L1 may be determined by measuring how long on average the data in bucket B4 waits in the queue, and where the data of buckets B1-B3 are transmitted, in order, prior to sending any data from the bucket B4. Generally, the wait delays in the table 500 may be obtained in any suitable manner. For example, in at least one embodiment, the wait delays in the table 500 may be obtained through testing using various data sets and profiles in connection with data replication using the RDF.

In at least one embodiment, a compression technique of the table 400 may be selected that has an expected average latency (column 406) that does not exceed an expected queue wait time of an entry of the table 500.

Figure 7:
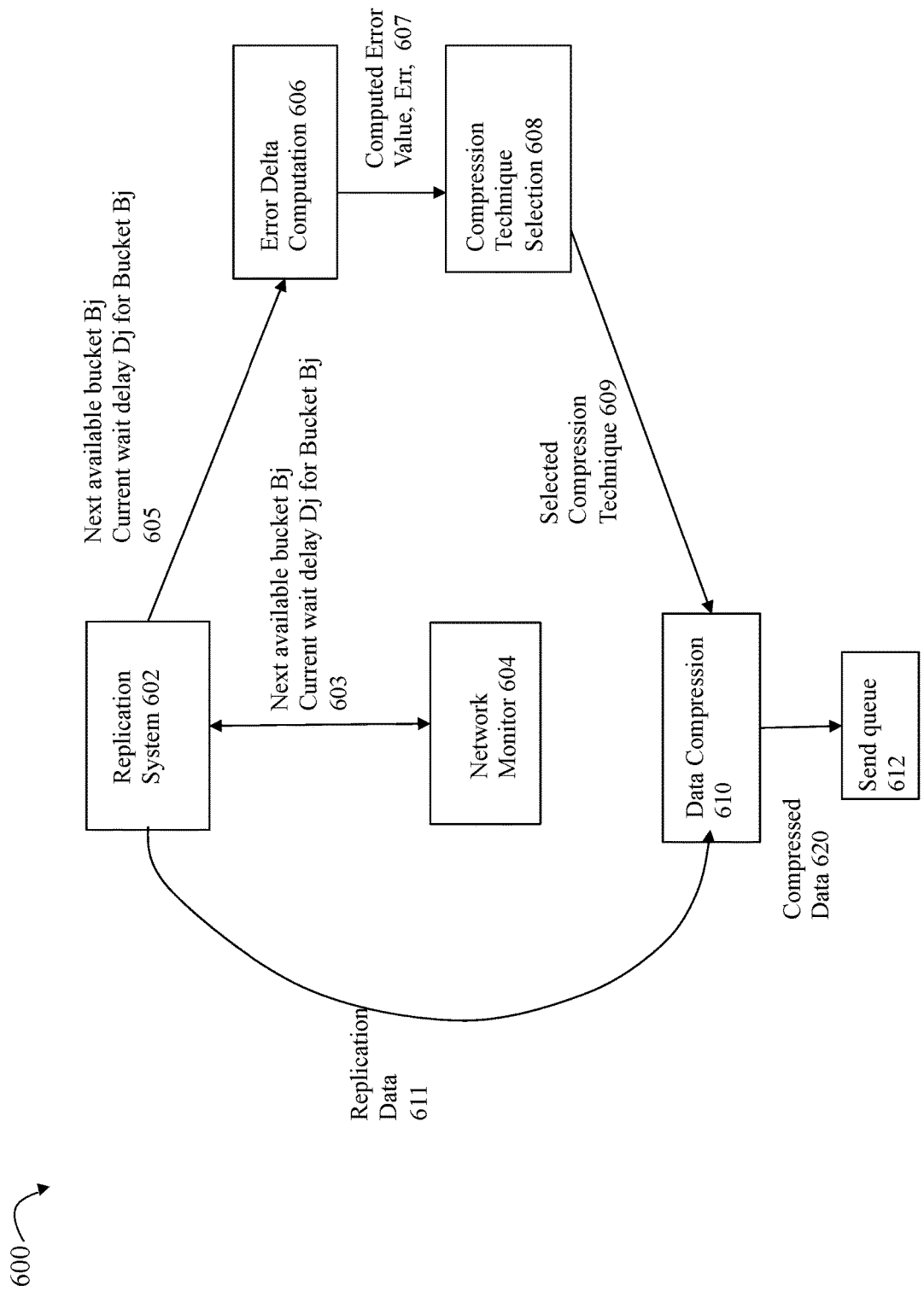
FIG. 7 is an example illustrating systems, components and processing flow in an embodiment in accordance with the techniques herein.

With reference to FIG. 7, shown is an example 600 of components and associated processing performed in at least one embodiment in accordance with the techniques herein. The example 600 includes a replication system 602, a network monitor component 604, an error delta computation component 606, a compression technique selection component 608, a data compression component 610 and a send queue 612.

The replication runtime behavior of the send window may be monitored to dynamically compute the average wait delay of data in each of the buckets B1-Bn. In at least one embodiment, one or more components, such as the network monitor component 604, may monitor the current network behavior and compute the average wait delays or latencies, D1-Dn, for every bucket B1-Bn. When the RDF or replication system 602 is processing a next data portion (denoted as replication data 611) to be replicated from the local system to the remote system, the replication system 602 may query (603) the network monitor 604 to return the next available bucket Bj in the send window or queue 612 that will include the compressed data portion. Additionally, the replication system 602 may query (603) the network monitor 604 to also return the current wait delay Dj for the next available bucket Bj in the send window or queue 612 that will include the compressed data portion. The replication system 602 provides the bucket Bj and its current wait delay Dj to the error delta computation component 606 that computes a value for the error metric, Err, discussed below.

In at least one embodiment, the error delta computation component 606 may compute an error percentage Err for the given Bj and Dj as in EQUATION 1 below:

$$Err = \frac{\text{Current wait delay} - \text{Expected queue wait delay}}{\text{Expected queue wait delay}} * 100 \quad \text{EQUATION 1}$$

Where

Current wait delay is Dj for the current Bj; and

Expected queue wait delay is the wait delay obtained from an entry in the table of FIG. 6 for Bj and given the particular network latency Li that corresponds to current observed or measured network latency (as may be determined by the network monitor component 604).

For example, assume that j=3 so that Bj=B3 denoting bucket 3 as the current bucket. Also, assume that the current observed or measured network latency of the network used to transmit data from the local to the remote system is L1 milliseconds corresponding to the first column of the table of FIG. 6. In this case, the value for the expected queue wait delay may be X41 microseconds obtained from the entry 506d of the table 500 having the indices (4,1), with one-based indexing. Based on the Expected queue wait delay of X41 microseconds and the current wait delay Dj, Err may be computed using EQUATION 1.

The computed error value, Err, may be provided (607) by the error delta computation component 606 to the compression technique selection component 608. The compression technique selection component 608 may then use the computed error value, Err, to select a compression technique to be used by the data compression component 610 when compressing the replication data 611. In at least one embodiment using EQUATION 1, the computed value for Err is a percentage.

Generally, if the value of Err is negative, it means the current wait delay is less than the expected queue wait delay; if the value of Err is positive, it means the current wait delay is more than the expected queue wait delay; and if the value of Err is 0, it means the current wait delay is the same as the expected queue wait delay.

In at least one embodiment, processing may be performed to determine whether Err meets a first set of conditions of whether the value of Err is negative and whether Err has an absolute value that is greater than a specified threshold. If the value of Err is negative and has an absolute value that is greater than a specified threshold, it means that the current wait delay is less than the expected queue wait delay by at least a specified amount. In such a case, the compression technique may be selected generally based on a second or revised expected queue wait delay included in the table 500 for another bucket Bk, where "k" is generally less than "j" (the current bucket Bj). In at least one embodiment, k=j−1, denoting that the second or revised expected queue wait delay may be included in the table 500 for the next lower bucket $B_{j-1}$. To further illustrate, consider the example where the expected queue wait delay is X41 microseconds as noted above and assume that Err is negative and has an absolute value greater than the first specified threshold. In this case, the second or revised expected queue wait delay that is used may be X31 microseconds from the entry 506c for the bucket B3 with a network latency of L1 milliseconds. Processing may be performed to select a data compression technique from the table 400 of FIG. 4 based on the second expected queue wait delay of X31 microseconds. In particular, the value of X31 microseconds may be compared to the different average latency values 406 in the table 400. One of the data compression techniques (as denoted in the column 402) may be selected from the table 400 of FIG. 5 that has an associated average latency (406) that is not greater than the second expected queue wait delay of X31 microseconds. In at least one embodiment, the compression technique selected may be the one having an associated average latency (406) that is closest to the second expected queue wait delay of X31 microseconds but also does not exceed the second expected queue wait delay of X31 microseconds. For example, assume all compression techniques except compression technique 3 has an associated average latency that exceeds the second expected queue wait delay of X31 microseconds. In this case, processing may select to use compression technique 3 to compress the replication data 611.

In at least one embodiment, processing may be performed to determine whether Err meets a second set of conditions of whether the value of Err is positive and whether Err has an absolute value that is greater than a specified threshold. If the value of Err is positive and has an absolute value that is greater than a specified threshold, it means that the current wait delay exceeds the expected queue wait delay by at least a specified amount. In such a case, the compression technique may be selected generally based on a second or revised expected queue wait delay included in the table 500 for another bucket Bk, where "k" is generally more than "j" (the current bucket Bj). In at least one embodiment, k=j+1, denoting that the second or revised expected queue wait delay may be included in the table 500 for the next higher bucket $B_{j+1}$. To further illustrate, consider the example where the expected queue wait delay is X41 microseconds as noted above and assume that Err is negative and has an absolute value greater than the first specified threshold. In this case, the second or revised expected queue wait delay that is used may be X51 microseconds from the entry 506f for the bucket B5 with a network latency of L1 milliseconds. Processing may be performed to select a data compression technique from the table 400 of FIG. 4 based on the second expected queue wait delay of X51 microseconds. In particular, the value of X51 microseconds may be compared to the different average latency values 406 in the table 400. One of the data compression techniques (as denoted in the column 402) may be selected from the table 400 of FIG. 5 that has an associated average latency (406) that is not greater than the second expected queue wait delay of X51 microseconds. In at least one embodiment, the compression technique selected may be the one having an associated average latency (406) that is closest to the second expected queue wait delay of X51 microseconds but also does not exceed the second expected queue wait delay of X51 microseconds. For example, assume all compression techniques except compression technique 2 has an associated average latency that exceeds the second expected queue wait delay of X51 microseconds. In this case, processing may select to use compression technique 2 to compress the replication data 611.

If the value of Err does not meet either the above-noted first set of conditions or the second set of conditions, the expected queue wait delay as originally determined, such as X41, may be used to select a data compression technique from the table 400 of FIG. 4. For example, the value of X41 microseconds may be compared to the different average latency values 406 in the table 400. One of the data compression techniques (as denoted in the column 402) may be selected from the table 400 of FIG. 5 that has an associated average latency (406) that is not greater than the expected queue wait delay of X41 microseconds. In at least one embodiment, the compression technique selected may be the one having an associated average latency (406) that is closest to the expected queue wait delay of X41 microseconds but also does not exceed the expected queue wait delay of X41 microseconds. For example, assume all compression techniques except compression technique 3 has an associated average latency that exceeds the expected queue wait delay of X41 microseconds. In this case, processing may select to use compression technique 3 to compress the replication data 611.

Referring again to FIG. 7, once the compression technique selection component 608 has selected the particular compression technique to be used, the component 608 provides (609) the selected compression technique to the data compression component 610. The data compression component 610 may receive the replication data 611 and then perform processing to compress the data 611 and generate corresponding compressed data 620 that is placed in the send queue 612. The send queue 612 may denote the queued buckets of data in the send window. Although not illustrated in FIG. 7, the buckets of data in the send queue 612 may be arranged as described in connection with FIG. 4. In at least one embodiment described herein, the data in the send queue 612 may be transmitted over an RDF link from the local system to the remote system.

The table 500 of FIG. 6 illustrates different wait delays for each of the buckets of data in the send window. In particular, for each bucket, the table 500 includes a row of wait delay entries for different network latencies. The table 500 may be configured prior to performing replication processing and may be used, during replication runtime as described in connection with FIG. 7, to predict the expected queue wait delay for a particular bucket and given the current observed network latency. At runtime, the current observed network latency may be obtained and a column from the table 500 may be selected having an associated network latency that is closest to the current observed network latency. The table 500 may be used, for example, in an embodiment as a prediction model where the variables are the network latency and the particular bucket. More generally, another version of the table 500 may be generated and used which accounts for multiple variables or factors including the particular bucket and one or more other factors that may affect the predicted or expected queue wait delays in a particular embodiment. The one or more factors may generally relate to different configurations of resources used to perform processing that affect the expected queue wait delays in the table 500. The one or more factors may relate to the configuration of resources of the local system and may relate to the network used to transmit the replicated data between the local and remote system. For example, the one or more factors may include any one or more of: the network latency of the network used for sending replicated data from the local system to the remote system; the number of dedicated CPUs or processors used in connection with sending replicated data and used for data compression processing of replicated data; the number of CPUs or processors that are not dedicated for sole use in connection with data compression or transmitting replicated data (e.g., such CPUs may also perform other processing tasks); for CPUs that are not dedicated for sole use in sending replicated data and compressing replication data with the techniques herein, the current workload of each of such one or more non-dedicated CPUs or processors; and the like.

For the different combinations of factors, additional columns of wait times may be added to the table 500 in FIG. 6 as needed. For example, the table 500 of FIG. 6 may be used in a first embodiment where a single dedicated CPU or processor is used to compress replication data. Other embodiments may allow for multiple dedicated CPUs or processors to be used, for example, in sending replicated data or compressing the replication data. In this case, the table 500 may also include additional columns to account for the different number of CPUs that may be used.

In at least one embodiment, processing may be performed that periodically updates the expected wait times in the table 500.

In at least one embodiment, processing may be performed to determine a statistical variance or standard deviation with respect to the difference between the current wait delay observed for a bucket and the expected queue wait delay for the bucket as obtained from an entry of table 500. If the variance or standard deviation is consistently above a specified threshold, such as more than 3 standard deviations from the mean, then it may mean that the predicted values in the table 500 may not be sufficiently accurate and may need to be reconfigured whereby the wait delays of the entries may be recomputed with additional testing, data collection and monitoring.

In at least one embodiment, if the variance or standard deviation with respect to the difference between the current wait delay observed for a bucket and the expected queue wait delay for the bucket as obtained from an entry of table 500 is consistently minimal, an embodiment may use a variation of processing described herein. In this case, the particular compression technique selected from the available compression techniques in the table 400 may be simply based on the current wait delay for the particular bucket of the send window into which the compressed data will be placed. In this case, the selection of the compression technique is based on the position or bucket in the queue which affects the expected queue wait time. However, additional computation and processing may be avoided. At a later point in time, if the variance or standard deviation with respect to the difference between the current wait delay observed for a bucket and the expected queue wait delay for the bucket as obtained from an entry of table 500 increases above a specified threshold and is no longer consistently minimal, replication processing may be performed as described above.

Figure 8:
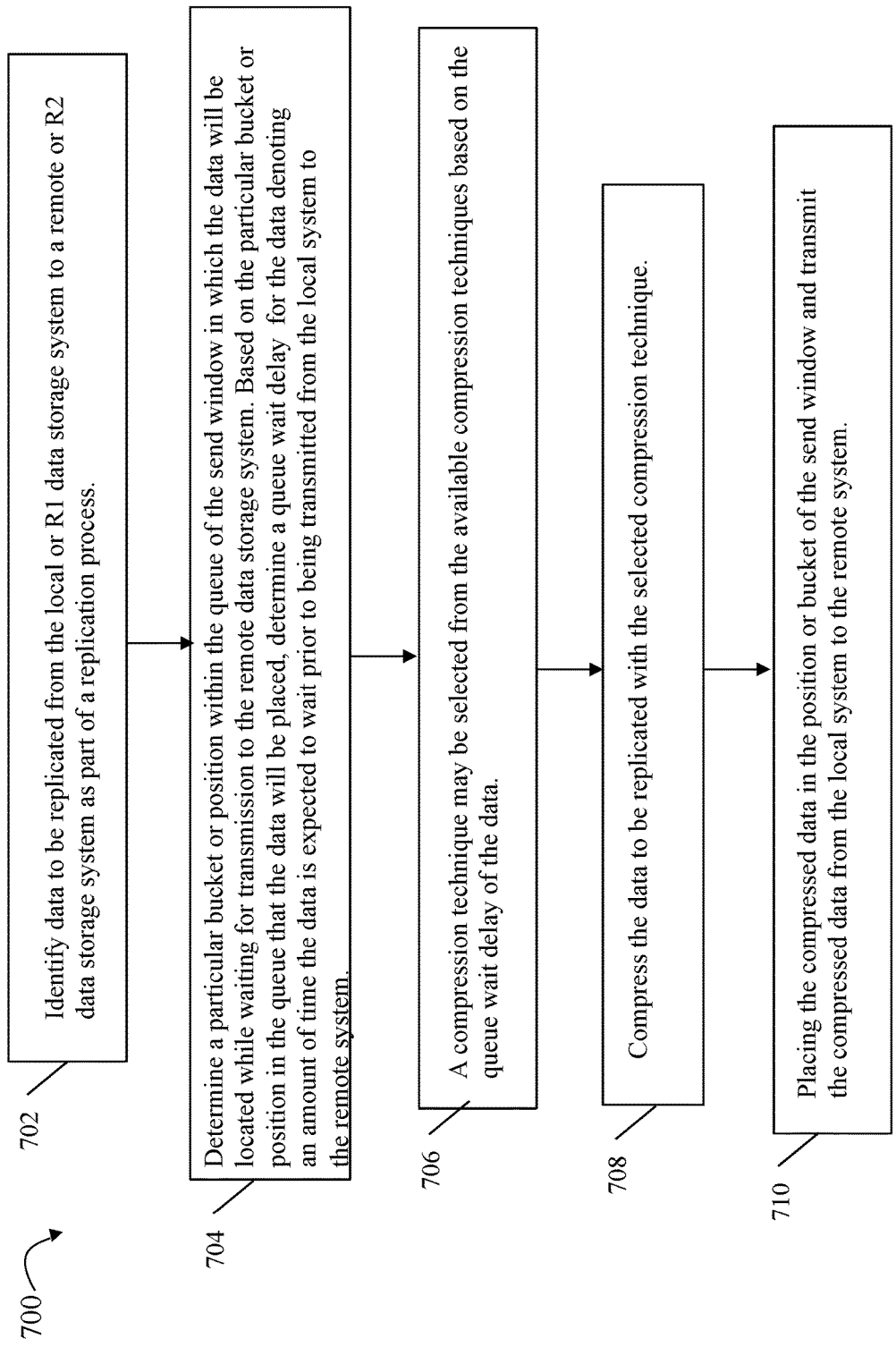
FIG. 8 is a flowchart of processing steps that may be performed in an embodiment in accordance with the techniques herein.

Referring to FIG. 8, shown is a flowchart 700 of processing steps that may be performed in an embodiment in accordance with the techniques herein. The flowchart 700 summarizes processing described above.

At the step 702, processing may be performed to identify data to be replicated from the local or R1 data storage system to a remote or R2 data storage system as part of a replication process. From the step 702, control proceeds to the step 704.

At the step 704, processing may be performed to determine a particular bucket or position within the queue of the send window in which the data will be located while waiting for transmission to the remote data storage system. Based on the particular bucket or position in the queue that the data will be placed, determine a queue wait delay for the data denoting an amount of time the data is expected to wait prior to being transmitted from the local system to the remote system. From the step 704, control proceeds to the step 706.

At the step 706, a compression technique may be selected from the available compression techniques based on the queue wait delay of the data. From the step 706, control proceeds to the step 708.

At the step 708, processing may be performed to compress the data to be replicated with the selected compression technique. From the step 708, control proceeds to the step 710.

At the step 710, processing may be performed to place the compressed data in the position or bucket of the send window and transmit the compressed data from the local system to the remote system.

An embodiment may implement the techniques herein using any suitable hardware and software. For example, the techniques herein may be performed by code executed on one or more processors. For example, an embodiment may implement the techniques herein using code which is executed by one or more processors of a data storage system, or more generally any other system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
    receiving, at a first data storage system, a write operation that writes first data to a first logical device of the first data storage system, wherein the first logical device is configured for replication on a second logical device of a second data storage system, wherein the first logical device is mapped to corresponding non-volatile physical storage provisioned from one or more physical storage devices of the first data storage system, and wherein the second logical device is mapped to corresponding non-volatile physical storage provisioned from one or more physical storage devices of the second data storage system; and
    performing first processing that replicates the first data of the first logical device from the first data storage system to the second data storage system, the first processing comprising:
        identifying the first data of the first logical device to be replicated on the second logical device of the second data storage system;
        selecting a first compression technique from a set of available compression techniques in accordance with a first expected wait delay associated with the first data, wherein the first data is located in a first bucket of a plurality of buckets forming a queue of data waiting to be transmitted to the second data storage system, and wherein the first expected wait delay denotes an amount of time the first bucket of data is expected to wait prior to being transmitted from the first data storage system to the second data storage system, wherein each of the plurality of buckets of the queue is associated with a corresponding one of a plurality of expected wait delays based on a particular position of said each bucket in the queue and wherein the corresponding one wait delay for said each bucket denotes an amount of time said each bucket of data is expected to wait prior to being transmitted from the first data storage system to the second data storage system, wherein the plurality of expected wait delays are determined in accordance with one or more factors including a network latency of at least one network used for replicating data from the first data storage system to the second data storage system;
        compressing the first data using the selected first compression technique and generating first compressed data; and
        sending, over the at least one network, the first compressed data from the first data storage system to the second data storage system.

2. The method of claim 1, wherein said sending sends the first compressed data to the second data storage system over a link between the first data storage system and the second data storage system, and wherein the link is included in the at least one network used by a remote data facility that performs automated data replication to replicate data from logical devices of the first data storage system to corresponding configured logical devices of the second data storage system.

3. The method of claim 2, wherein a sending window is associated with the link and wherein the sending window includes the queue of data transmitted from the first data storage system to the second data storage system as part of replication processing that replicates data from the first data storage system to the second data storage system, and wherein the replication processing is performed by the remote data facility.

4. The method of claim 3, wherein the sending window is partitioned into the plurality of buckets and wherein the first bucket including the first data is one of the plurality of buckets of the sending window of the link.

5. The method of claim 4, wherein the first expected wait delay is an average expected wait delay denoting an average wait time expected prior to transmitting the first bucket of data.

6. The method of claim 5, wherein the plurality of buckets of the sending window form a sequence denoting a sequential order in which the plurality of buckets of data is transmitted from the first data storage system to the second data storage system.

7. The method of claim 4, wherein a table includes the plurality of expected wait delays for the plurality of buckets, and wherein the table comprises a first entry that includes the first expected wait delay for the first bucket.

8. The method of claim 7, wherein the table includes a different set of entries for each of the plurality of buckets, and wherein each entry of the different set of entries for said each bucket denotes an expected wait delay for data of said each bucket for a different network latency.

9. The method of claim 7, wherein the table is preconfigured prior to performing the first processing that replicates the first data from the first data storage system to the second data storage system.

10. The method of claim 7, wherein the table includes a different set of entries for each of the plurality of buckets, and wherein each entry of the different set of entries for said each bucket denotes an expected wait delay for data of said each bucket in accordance with the one or more factors related to a configuration of the first data storage system and related to the at least one network between the first data system and the second data storage system.

11. The method of claim 10, wherein the one or more factors further include any one or more of: a first number denoting a number of processors that compress data that is replicated from the first data storage system to the second data storage system, a current workload of each of one or more processors used to compress data that is replicated from the first data storage system to the second data storage system, a second number denoting a number of components that compress data that is replicated from the first data storage system to the second data storage system, and a current workload of each of one or more components that compress data that is replicated from the first data storage system to the second data storage system.

12. The method of claim 7, wherein the first processing includes:
    determining a first value for an error metric in accordance with a current wait delay and the first expected wait delay for the first bucket; and
    if the first value indicates that the current wait delay is less than the first expected wait delay by at least a specified threshold amount, selecting the first compression technique from the set of available compression techniques based on a second expected wait delay of the table associated with a second of the plurality of buckets of data transmitted to the second data storage system, wherein the second bucket of data is transmitted prior to the second data storage system prior to the first bucket of data, and wherein the second expected wait delay is less than the first expected wait delay.

13. The method of claim 12, wherein a first expected average compression latency of using the first compression technique to compress the first data is not greater than the second expected wait delay.

14. The method of claim 7, wherein the first processing includes:
   determining a first value for an error metric in accordance with a current wait delay and the first expected wait delay for the first bucket; and
   if the first value indicates that the current wait delay is more than the first expected wait delay by at least a specified threshold amount, selecting the first compression technique from the set of available compression techniques based on a second expected wait delay of the table associated with a second of the plurality of buckets of data, wherein the second bucket of data is transmitted to the second data storage system after the first bucket of data, and wherein the second expected wait delay is more than the first expected wait delay.

15. The method of claim 14, wherein a first expected average compression latency of using the first compression technique to compress the first data is not greater than the second expected wait delay.

16. The method of claim 3, wherein the sending window has a size that is a maximum amount of outstanding data the first data storage system is allowed to send to the second data storage system over the link without receiving an acknowledgement regarding successful transmission to the second data storage system.

17. The method of claim 1, wherein the set of available compression techniques includes a plurality of compression techniques each having a different compression rate and each having a different expected average compression latency for compressing the first data.

18. The method of claim 17, wherein a table includes the set of available compression techniques and associated information regarding each of the available compression techniques, and wherein the associated information for said each available compression technique includes the different expected average compression latency for said each available compression technique.

19. The method of claim 1, wherein the network latency denotes a round trip latency time for transmitting data over the at least one network used for replicating data from the first data storage system to the second data storage system.

20. A non-transitory computer readable medium comprising code stored thereon that, when executed, performs a method of processing data comprising:
   receiving, at a first data storage system, a write operation that writes first data to a first logical device of the first data storage system, wherein the first logical device is configured for replication on a second logical device of a second data storage system, wherein the first logical device is mapped to corresponding non-volatile physical storage provisioned from one or more physical storage devices of the first data storage system, and wherein the second logical device is mapped to corresponding non-volatile physical storage provisioned from one or more physical storage devices of the second data storage system; and
   performing first processing that replicates the first data of the first logical device from the first data storage system to the second data storage system, the first processing comprising:
      identifying the first data of the first logical device to be replicated on the second logical device of the second data storage system;
      selecting a first compression technique from a set of available compression techniques in accordance with a first expected wait delay associated with the first data, wherein the first data is located in a first bucket of a plurality of buckets forming a queue of data waiting to be transmitted to the second data storage system, and wherein the first expected wait delay denotes an amount of time the first bucket of data is expected to wait prior to being transmitted from the first data storage system to the second data storage system, wherein each of the plurality of buckets of the queue is associated with a corresponding one of a plurality of expected wait delays based on a particular position of said each bucket in the queue and wherein the corresponding one wait delay for said each bucket denotes an amount of time said each bucket of data is expected to wait prior to being transmitted from the first data storage system to the second data storage system, wherein the plurality of expected wait delays are determined in accordance with one or more factors including a network latency of at least one network used for replicating data from the first data storage system to the second data storage system;
      compressing the first data using the selected first compression technique and generating first compressed data; and
      sending, over the at least one network, the first compressed data from the first data storage system to the second data storage system.

21. A system comprising:
one or more processors; and
one or more memories including code stored thereon that, when executed, performs a method of processing data comprising:
   receiving, at a first data storage system, a write operation that writes first data to a first logical device of the first data storage system, wherein the first logical device is configured for replication on a second logical device of a second data storage system, wherein the first logical device is mapped to corresponding non-volatile physical storage provisioned from one or more physical storage devices of the first data storage system, and wherein the second logical device is mapped to corresponding non-volatile physical storage provisioned from one or more physical storage devices of the second data storage system; and
   performing first processing that replicates the first data of the first logical device from the first data storage system to the second data storage system, the first processing comprising:
      identifying the first data of the first logical device to be replicated on the second logical device of the second data storage system;
      selecting a first compression technique from a set of available compression techniques in accordance with a first expected wait delay associated with the first data, wherein the first data is located in a first bucket of a plurality of buckets forming a queue of data waiting to be transmitted to the second data storage system, and wherein the first expected wait delay denotes an amount of time the first bucket of data is expected to wait prior to being transmitted from the first data storage system to the second data storage system, wherein each of the plurality of buckets of the queue is associated with a corresponding one of a plurality of expected wait delays based on a particular position of said each bucket in the queue and wherein the corresponding one wait delay for said each bucket denotes an amount of time said each bucket of data is expected to wait prior to being transmitted from the first data storage system to the second data storage system, wherein the plurality of expected wait delays are determined in accordance with one or more factors including a network latency of at least one network used for replicating data from the first data storage system to the second data storage system;

compressing the first data using the selected first compression technique and generating first compressed data; and sending, over the at least one network, the first compressed data from the first data storage system to the second data storage system.

* * * * *